Jan. 2, 1923.
N. ROACH.
ARBOR CONSTRUCTION.
FILED JUNE 19, 1920.
1,440,494.
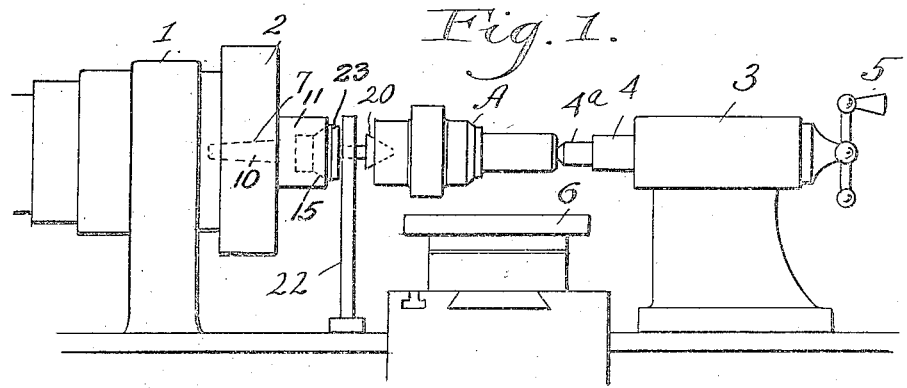
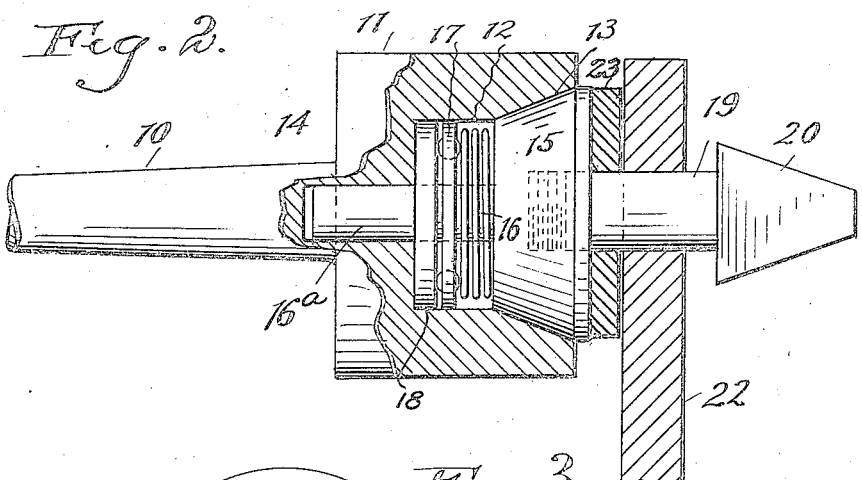
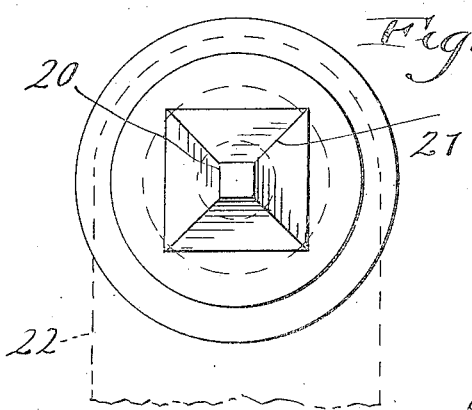
Inventor.
Nathan Roach
by
Thurston Kwis & Hudson
attys.

Patented Jan. 2, 1923.

1,440,494

UNITED STATES PATENT OFFICE.

NATHAN ROACH, OF CLEVELAND, OHIO, ASSIGNOR TO THE CLEVELAND BRASS MANUFACTURING COMPANY, OF CLEVELAND, OHIO, A CORPORATION OF OHIO.

ARBOR CONSTRUCTION.

Application filed June 19, 1920. Serial No. 390,095.

*To all whom it may concern:*

Be it known that I, NATHAN ROACH, a citizen of the United States, residing at Cleveland, in the county of Cuyahoga and State of Ohio, have invented a certain new and useful Improvement in Arbor Constructions, of which the following is a full, clear, and exact description.

The present invention relates to a device wherein a spindle which serves as a centering spindle or support for an article upon which some work is to be done is associated with a driven member and clutch mechanism, whereby the spindle may be caused to turn and cease from turning at will.

The device finds special utility as an attachment for a machine wherein objects are intermittently and more or less rapidly inserted and removed, having some work performed on them while in the machine.

Frequently such operations require that an operator insert the article in a machine, perform some short operation such as trimming, burnishing etc. and then remove the article. Under such conditions, speed in inserting and removing the articles, is of prime importance and the present invention is directed to facilitate the speeding up of such operations.

Reference should be had to the accompanying drawings forming a part of this specification in which Fig. 1 is an elevation of a portion of a machine having the device of the present invention incorporated therewith; Fig. 2 is a sectional elevation of a portion of the device; Fig. 3 is a front elevation of a portion of the device.

Without in any way intending to limit the scope of applicability of the invention, a description of the invention will be given as exemplified in its application to a lathe in which lathe articles are successively positioned, some operation performed on them and the article removed.

Referring to the drawing, 1 represents a bracket or support for the work driving element 2, this element being free to turn in the bracket 1 and is driven in any desired manner. In connection with all such lathes it is usual to have some belt shifting mechanism or an equivalent mechanism by which the driving mechanism for the element 2 is caused to be on or off. Such a mechanism is not shown but it is so commonly known in this art that illustration or description does not need to be given.

The member 3 of the lathe is represented at 3 and is slidable along the bed of the lathe in the usual and well known fashion. This member is provided with the usual and well known tail stock spindle such as represented at 4 which is turned inwardly or outwardly by means of the crank construction 5.

The tool carriage is generally represented at 6 and while the tool bracket or post is not shown, it will be understood that the carriage 6 is intended to support such a tool post.

It is usual practice for the element 2 to have a suitable opening such as indicated in dotted lines at 7 in which a pointed arbor is inserted in alignment with the lathe center $4^a$ carried by the sliding member 4 and work which is placed in the machine to be operated on, is centered on these arbors. In inserting and removing an article from the lathe under the usual conditions, it is necessary to stop rotation of the element 2, insert the article by centering it between the arbors, again start the machine and perform the operation on the article and in removing the article, the machine must be stopped and the handle 5 operated until the article is released.

In the present invention there is provided an arbor such as indicated at 10 which is adapted to fit into the opening or recess 7 in the element 2. The arbor 10 has an enlarged portion 11 which has a recess 12 with substantially straight side walls and throughout a portion of its extent has slanting side walls as indicated at 13, thus presenting in general a cone effect. Extending rearwardly from the opening 12 is a recess 14 which is adapted to receive a stub shaft $16^a$, which stub shaft has preferably, although not necessarily integrally formed therewith a head 15, the side wall of which is complementary to the slant of the wall 13. Behind the head 15 is a spring 16 which bears against a ball thrust plate 17 and this in turn bears against a plate 18, the plates 17 and 18 having openings therein through which the stub shaft $16^a$ extends. The spring 16 is such that the normal thrust of the spring is to push the head 15 out of engagement with the walls 13.

Either formed integrally or separately formed and attached to the head 15 is a short shaft 19, the axis of which is in alignment with the stub shaft 16ª. This short shaft 19 has a head as indicated at 20, which head is preferably formed with edges such as indicated at 21 in Fig. 3. In the figure referred to the head is shown as that of a truncated pyramid. This is but suggestive and other forms of head may be used.

Secured to and supported upon the bed of the lathe is an upright member 22. This member has an opening through which the short shaft 19 extends. The member 22 is fixedly supported.

Affixed to the head 15 in any suitable manner is a friction disc 23, this disc being carried upon the head 15 adjacent the upright member 22.

When the arbor 10 is inserted in the element 2 it has a close driving fit so that the arbor 10 and the enlargement 11 which is connected to the arbor 10 will rotate when the head is rotated. Under the normal action of the spring 16 the head 15 is out of engagement with the walls 13 of the member 11 and the friction disc 23 is in contact with the upright member 22, hence any tendency of the head 15 to rotate is obviated, although the arbor 10 and the enlarged member 11 may be rotating with the element 2. It will also be clear that under the situation explained, the short shaft 19 and the end member 23 as carried thereby are also arrested from rotation.

If under the condition named, that is to say, with the element 2 rotating, an article A be positioned in the lathe so that the portion 20 is contacting or engaging with the article at one end thereof and the lathe center 4ª is contacting with the other end thereof, then if the lathe center 4ª be moved by turning the crank 5, the head 15 will be moved against the action of the spring 16, until the walls 13 are engaged whereupon the head 15 and the parts associated therewith will rotate, and consequently induce rotation of the article A.

During this rotation such work as is desired is performed upon the article A and as soon as this is completed the crank 5 is turned in a direction to move the lathe center 4ª outwardly, which operation relieves the compression of the spring 16, forcing the head 15 out of its clutching engagement and as the disc 23 engages with the upright member 22, rotation of the head 15 and the parts associated therewith is arrested and article A stops rotating so that it may be removed from the lathe and replaced by another article.

It will be seen from the foregoing that successive articles may be placed in the lathe and removed from the lathe without stopping rotation of the element 2, which results in a great saving of time and the consequent ability to operate upon an increased number of articles over what would be the case if the machine had to be started and stopped as described.

Having described my invention, I claim—

The combination with a head having a recess formed therein, a clutch face forming a part of said recess, of an arbor, a member carried by said arbor and having a surface adapted to cooperate with said clutch face, the said arbor having a portion extending through the recess in the head and having a bearing in the head, a thrust member located in the recess, a resilient member extending between the thrust member and the member carried by the arbor to normally hold the member on the arbor out of clutched position, friction material carried by the arbor and a stationary member with which the said friction material is adapted to engage when the member on the arbor is in unclutched position.

In testimony whereof, I hereunto affix my signature.

NATHAN ROACH.